(12) United States Patent
Rosenzweig et al.

(10) Patent No.: US 8,184,715 B1
(45) Date of Patent: May 22, 2012

(54) METHOD FOR EFFICIENTLY EXECUTING VIDEO ENCODING OPERATIONS ON STREAM PROCESSOR ARCHITECTURES

(75) Inventors: Jesse J. Rosenzweig, Portland, OR (US); Brian Gregory Lewis, Portland, OR (US); Samuel Blackman, Portland, OR (US)

(73) Assignee: Elemental Technologies, Inc., Portland, OR (US)

( * ) Notice: Subject to any disclaimer, the term of this patent is extended or adjusted under 35 U.S.C. 154(b) by 936 days.

(21) Appl. No.: 12/189,735

(22) Filed: Aug. 11, 2008

Related U.S. Application Data

(60) Provisional application No. 60/964,340, filed on Aug. 9, 2007.

(51) Int. Cl.
H04N 11/02 (2006.01)
(52) U.S. Cl. ......... 375/240.24; 375/240.13; 375/240.14; 375/240.17; 375/240.18
(58) Field of Classification Search ............ 375/240.13, 375/240.14, 240.15, 240.16, 240.17, 240.18, 375/240.24
See application file for complete search history.

(56) References Cited

U.S. PATENT DOCUMENTS

| | | | |
|---|---|---|---|
| 5,280,349 A | 1/1994 | Wang | |
| 5,414,468 A | 5/1995 | Lee | |
| 5,557,332 A | 9/1996 | Koyanagi | |
| 5,565,920 A | 10/1996 | Lee | |
| 5,675,331 A | 10/1997 | Watanabe | |
| 5,699,460 A * | 12/1997 | Kopet et al. | 382/307 |
| 5,963,260 A | 10/1999 | Bakhmutsky | |
| 6,058,143 A | 5/2000 | Golin | |
| 6,434,196 B1 * | 8/2002 | Sethuraman et al. | 375/240.12 |
| 6,504,872 B1 | 1/2003 | Fimoff | |
| 6,577,767 B2 | 6/2003 | Lee | |
| 6,587,590 B1 * | 7/2003 | Pan | 382/250 |
| 6,771,704 B1 | 8/2004 | Hannah | |
| 6,870,883 B2 | 3/2005 | Iwata | |
| 6,888,477 B2 | 5/2005 | Lai | |
| 6,952,211 B1 * | 10/2005 | Cote et al. | 345/473 |
| 7,339,993 B1 | 3/2008 | Brooks | |
| 7,376,590 B2 | 5/2008 | Lee | |
| 7,634,776 B2 * | 12/2009 | Parameswaran et al. | 718/105 |

(Continued)

FOREIGN PATENT DOCUMENTS

JP 2004140473 A 5/2004

(Continued)

OTHER PUBLICATIONS

Thinh M. Le et al. SIMD processor arrays for image and video processing: a review, Multimedia Hardware Architectures, 1998, vol. 3311 of SPIE Proceedings (http://www.doe.carleton.ca/~thinh/./papers/mha98/array98.ps).

(Continued)

*Primary Examiner* — Ayaz Sheikh
*Assistant Examiner* — Andrew C Lee
(74) *Attorney, Agent, or Firm* — Stolowitz Ford Cowger LLP

(57) ABSTRACT

Techniques are disclosed for employing a set of stream processors to greatly accelerate common video encoding and transcoding tasks, with the goal of making these tasks run at a reasonable rate on off-the-shelf hardware. Stream processors are most commonly found in the graphics processing unit (GPU), a commodity piece of computer hardware used to generate images for display. Embodiments of the invention are particularly advantageous to accelerate video encoding and transcoding tasks in which the blocks being processed have dependencies on their neighboring blocks.

20 Claims, 6 Drawing Sheets

U.S. PATENT DOCUMENTS

| | | |
|---|---|---|
| 7,646,810 B2 * | 1/2010 | Tourapis et al. ......... 375/240.12 |
| 2001/0047517 A1 | 11/2001 | Christopoulos |
| 2002/0064314 A1 | 5/2002 | Comaniciu |
| 2002/0136298 A1 | 9/2002 | Anantharamu |
| 2002/0157112 A1 | 10/2002 | Kuhn |
| 2003/0028643 A1 | 2/2003 | Jabri |
| 2003/0123748 A1 * | 7/2003 | Sebot et al. ................... 382/254 |
| 2004/0076333 A1 | 4/2004 | Zhang |
| 2004/0101056 A1 | 5/2004 | Wong |
| 2004/0161035 A1 | 8/2004 | Wedi |
| 2004/0213345 A1 | 10/2004 | Holcomb |
| 2004/0218673 A1 | 11/2004 | Wang |
| 2004/0254290 A1 | 12/2004 | Gunnewick |
| 2005/0019000 A1 | 1/2005 | Lim |
| 2005/0091696 A1 | 4/2005 | Wolfe |
| 2005/0134735 A1 | 6/2005 | Swartz |
| 2005/0147033 A1 | 7/2005 | Chin |
| 2005/0160471 A1 | 7/2005 | Cohen |
| 2005/0262510 A1 * | 11/2005 | Parameswaran et al. ..... 718/105 |
| 2006/0018378 A1 | 1/2006 | Piccinelli |
| 2006/0056513 A1 * | 3/2006 | Shen et al. ............... 375/240.16 |
| 2006/0083308 A1 | 4/2006 | Schwarz |
| 2006/0093042 A1 | 5/2006 | Kashima et al. |
| 2006/0095944 A1 | 5/2006 | Demircin |
| 2006/0114989 A1 | 6/2006 | Panda |
| 2006/0126667 A1 | 6/2006 | Smith |
| 2006/0193388 A1 | 8/2006 | Woods et al. |
| 2006/0268991 A1 | 11/2006 | Segall |
| 2007/0053436 A1 | 3/2007 | Van Eggelen |
| 2007/0086528 A1 * | 4/2007 | Mauchly et al. ......... 375/240.24 |
| 2007/0091815 A1 | 4/2007 | Tinnakornsrisuphap |
| 2007/0098070 A1 | 5/2007 | Saigo et al. |
| 2007/0223580 A1 | 9/2007 | Ye et al. |
| 2007/0285285 A1 | 12/2007 | Puri et al. |
| 2008/0063082 A1 | 3/2008 | Watanabe |
| 2008/0123750 A1 * | 5/2008 | Bronstein et al. ........ 375/240.24 |
| 2008/0126278 A1 * | 5/2008 | Bronstein et al. ................ 706/17 |
| 2009/0034856 A1 * | 2/2009 | Moriya et al. ................. 382/238 |
| 2009/0092326 A1 * | 4/2009 | Fukuhara et al. ............. 382/233 |
| 2009/0290635 A1 | 11/2009 | Kim |

FOREIGN PATENT DOCUMENTS

| | | |
|---|---|---|
| JP | 2007174569 A | 7/2007 |
| WO | WO 03/036980 A1 | 5/2003 |
| WO | WO 2004/010670 A1 | 1/2004 |

OTHER PUBLICATIONS

Stolowitz Ford Cowger LLP List of Related Cases dated Dec. 23, 2011.

Wedi, "New Results on Adaptive Interpolation Filter," May 10, 2002.

Tambankar et al., "An Overview of H.264/MPEG-4 Part 10," Jul. 2, 2003.

Wedi, "Advanced Motion Compensated Prediction Methods," Oct. 18, 2003.

Blaszak et al., "Scalable AVC Codec," Mar. 6, 2004.

Schwarz et al., "SVC Core Experiment 2.1: Inter-Layer Prediction of motion and Residual Data," Jul. 14, 2004.

Teng et al., "Design and Evaluation of mProducer: a Mobile Authoring Tool for Personal Experience Computing": Oct. 27-29, 2004; 8 pages.

\* cited by examiner

FIG. 4

|   | 0 | 1 | 2 | 3 | 4 |
|---|---|---|---|---|---|
| 0 | 0 | 1 | 2 | 3 | 4 |
| 1 | 1 | 2 | | 4 | 5 |
| 2 | 2 | | | 5 | 6 |
| 3 | 3 | 4 | 5 | 6 | 7 |
| 4 | 4 | 5 | 6 | 7 | 8 |

Inset at (1,2):
| 0 | 1 | 2 | 3 |
| 1 | 2 | 3 | 4 | 5 |
| 2 | 3 | 4 | 5 | 6 |
| 3 | 4 | 5 |

Inset at (2,1):
| 0 | 1 | 2 | 3 |
| 1 | 2 | 3 | 4 | 5 |
| 2 | 3 | 4 | 5 | 6 |
| 3 | 4 | 5 |

FIG. 5

METHOD FOR EFFICIENTLY EXECUTING VIDEO ENCODING OPERATIONS ON STREAM PROCESSOR ARCHITECTURES

RELATED APPLICATIONS

This application claims priority from U.S. Provisional Application No. 60/964,340 filed Aug. 9, 2008 and incorporated herein by this reference.

COPYRIGHT NOTICE

Copyright© 2007-2008 Elemental Technologies, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever provided under at least 37 CFR §1.71(d).

TECHNICAL FIELD

Digital video processing, namely compression, decompression and transcoding especially using stream processors of a GPU.

BACKGROUND

Processing compressed digital video requires an enormous amount of computational horsepower. Modern central processing units (CPUs) are not keeping up with the demand for horsepower, resulting in the slow processing of video compression and processing tasks. This result has different ramifications for different users. For high-end professionals and broadcast infrastructure applications, specialized hardware is currently used. This hardware is produced in low volumes and thus tends to be expensive. On the other hand, for video editing hobbyists and average consumers, it is unusual to purchase expensive hardware to augment an off-the-shelf personal computer. Instead, these users rely entirely on the computer's CPU to sequentially perform the tasks. This runs much slower than real-time, causing the user to wait long periods of time for basic operations like converting a video file from one format to another.

Moving to a parallel architecture has the potential to accelerate many of these tasks. However, significant parallelization is difficult to achieve because block-based codec algorithms require some serialization due to the requirement for neighbor blocks to have been coded prior to the current block. Multiple blocks cannot be processed at the same time because each relies on information from neighboring blocks, which may not have been processed yet. Operations such as intra prediction, motion estimation and compensation, and deblocking are just a few examples of block-based algorithm calculations which rely on neighboring blocks. Utilizing stream processor architectures with conventional algorithms provides no performance increase for these operations.

The need remains therefore for improvements in video processing to achieve improvements in performance, especially speed, while leveraging relatively low-cost hardware. Several preferred examples of the present application will now be described with reference to the accompanying drawings. Various other examples of the invention are also possible and practical. This application may be exemplified in many different forms and should not be construed as being limited to the examples set forth herein.

BRIEF DESCRIPTION OF THE DRAWINGS

FIG. 4 is a conceptual diagram illustrating 45-degree sweep technique consistent with an alternative embodiment of the invention.

FIG. 5 is a conceptual illustration of processing predictions and transforms using two kernels; one sweep for prediction, and 8 sweeps for transforms.

DETAILED DESCRIPTION OF PREFERRED EMBODIMENTS

Block based video compression, especially H.264, takes advantage of correlations of any given block to surrounding neighbor blocks by predicting a block based on the neighbor blocks.[1] Intra-frame prediction is calculated generally in the following manner (we will describe the process for luma blocks, but chroma is processed in a similar fashion). A prediction (for the current block) is formed based on previously encoded neighboring blocks in a reconstructed frame.[2] This block is subtracted from the current block prior to encoding, and for the luma case may be formed for each 16×16 macroblock or 4×4 partitions inside the macroblock. In the 4×4 partitioning case, there are 9 optional prediction modes that can be applied, while in the 16×16 macroblock case, there are 4 optional modes. The difference between the actual block and the prediction is called the residual macroblock, and the residual is what is encoded and sent to a decoder. A similar process is applied to every macroblock of the frame. Inter-frame prediction works in a similar manner, but the prediction is based on motion from previously encoded frames.

[1] ITU-T Recommendation H.264; a video coding standard. Also called Advanced Video Coding or "AVC".
[2] Reconstructed frame is the one that is currently being encoded. It becomes the reference frame for the next picture.

Figure 1:
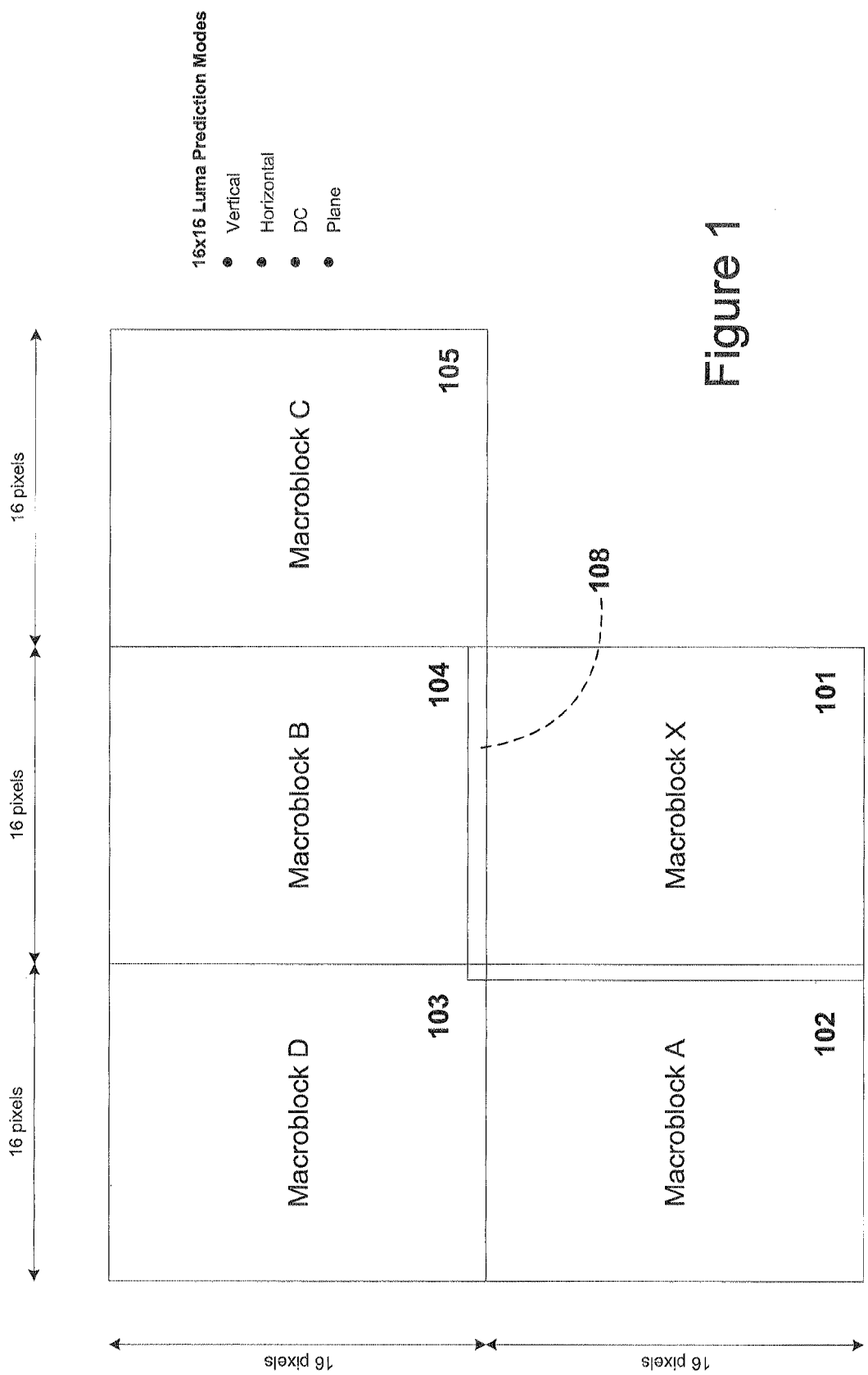
FIG. 1 is a conceptual diagram of a region of a coded video frame illustrating neighboring 16×16 macroblocks.

To illustrate the intra-frame prediction 16×16 pixel macroblock case, see FIG. 1. Macroblock X is the macroblock under analysis for best compression. Surrounding macroblocks A (102), D (103), and B (104) are used for the four different prediction options, which are listed on the right, namely: Vertical, Horizontal, DC, and Plane. For example, in the Vertical mode, the bottom row of pixels 108 from Macroblock B are extended downward and compared with the pixels in Macroblock X. The Sum of Absolute Differences (SAD), or the Sum of Absolute Transform Differences (SATD) is computed, and then these results are compared with the results of the other three prediction options. Using the option that has the lowest difference (SAD or SATD) will result in the highest compression ratio. Thus, the best match is chosen as the predictor for the current Macroblock X. Further details of these prediction modes are known. SATD has been shown to give the best resulting compression, but for simplicity of explanation, we will refer to SAD. It is used by way of illustration and not limitation.

Figure 2:
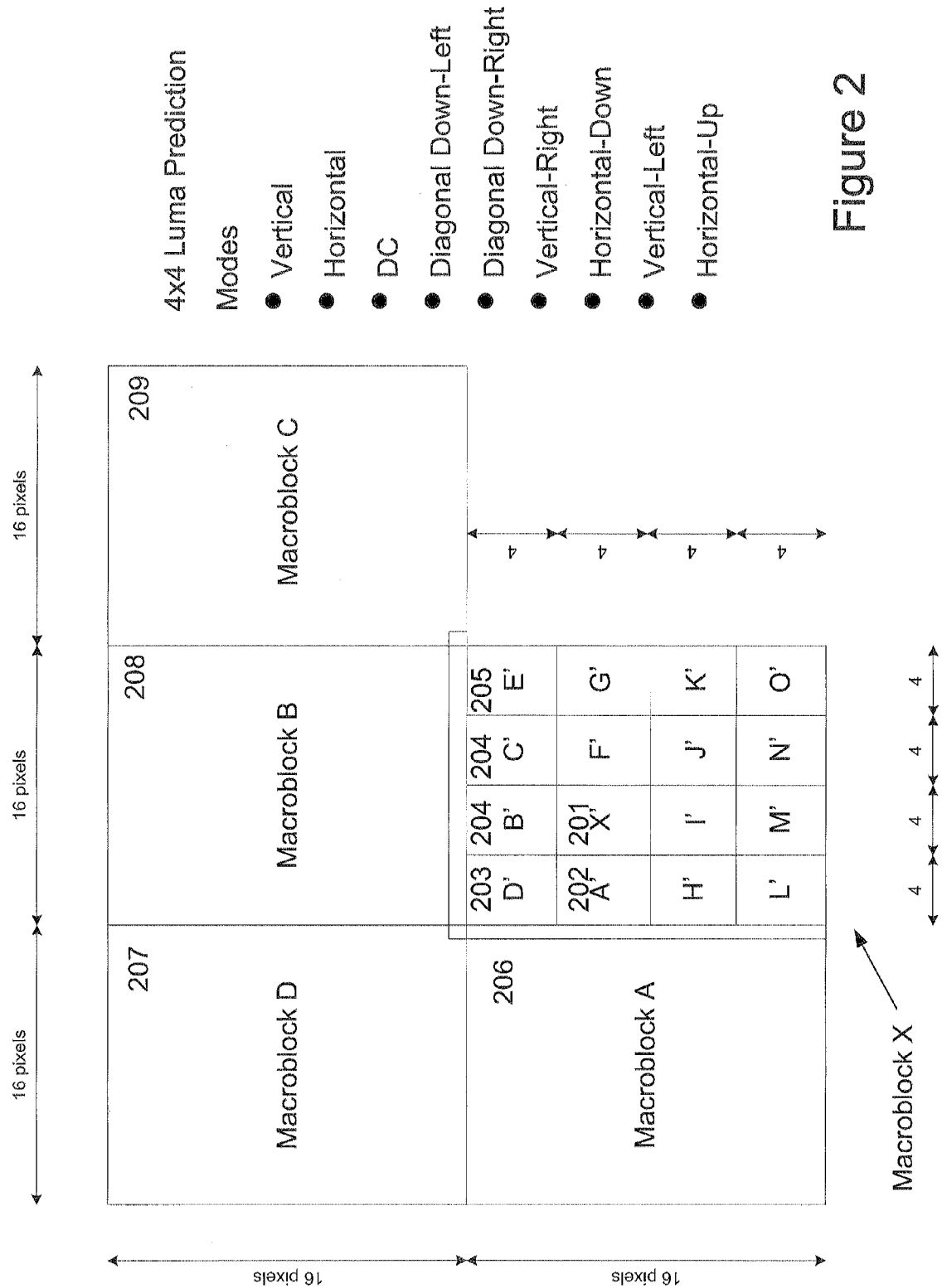
FIG. 2 is a conceptual diagram of the region of FIG. 1 illustrating macroblock X partitioning into 4×4 sub-blocks.

To illustrate the 4×4 block partitioning case, see FIG. 2. Macroblock X has now been divided up into 16 4×4 sub-blocks. Each sub-block preferably uses pixels from the left and top sides to predict the contents of the current sub-block using the SAD metric. For example, in horizontal prediction mode, the four pixels to the left from block A' (202) will be used to calculate the SAD for block X' 201 by replicating those pixels horizontally across by 4 pixels creating a 16 pixel block. This process may be repeated for one or more of the other eight prediction modes, and the option that generates the lowest SAD (or other selected metric) will be selected. The 4×4 Luma Prediction Modes are: (1) Vertical, (2) Horizontal, (3) DC, (4) Diagonal Down-Left, (5) Diagonal Down-Right, (6) Vertical-Right, (7) Horizontal-Down, (8) Vertical-Left, and (9) Horizontal-Up.

To obtain the best compression performance, the Sum of Absolute Differences must be performed for each prediction mode for the 16×16 macroblock and for the 4×4 sub-block. Implementation of these calculations on a sequential processor such as a CPU processes each macroblock in raster scan order (i.e. from left to right, processing row 0, then row 1, row 2, etc).

Inter-frame block prediction requires searching each block of pixels for a matching block of pixels closest to the predicted motion vector in any cached reference frame. Again. SAD or SATD is used to find the best matching block. This process is called motion estimation and is a valuable tool in video compression. Motion is highly correlated to neighboring blocks and thus the predicted motion vector is calculated with neighboring block motion vectors, thus creating yet another dependency on neighboring blocks from the block currently being encoded. Moreover, macroblocks may be partitioned at least four different ways and motion compensated either as one 16×16 macroblock partition, two 16×8 partitions, two 8×16 partitions or four 8×8 partitions. In the 8×8 mode, each of the four sub-macroblocks may be further split in four ways. There are many possible combinations, and a separate motion vector is required for each partition or sub-macroblock, all of which presents an imposing processing challenge to meet reasonable timing constraints.

After predictions are calculated, the next step in video compression is transforming the residuals into a frequency representation of the data (such as DCT) and then quantizing the high frequency content away before entropy encoding of the result. These processes as well as DCT are computationally expensive. We have discovered techniques to improve parallelism of these kinds of processes.

Accordingly we disclose herein various implementations that enable efficient processing of macroblocks with neighboring block dependencies, utilizing highly parallel stream processing architectures. Various embodiments will offer tradeoffs between compression efficiency and parallelism. To illustrate, our examples focus on a modern block-based image compression format variously known as H.264, Advanced Video Codec (AVC), or MPEG-4 Part 10. For the purposes of this document, we will use "AVC" to refer to the format.

There are several computationally-intensive portions of the AVC compression or decompression processes where the current block being processed has dependency on neighboring blocks. We mentioned several of these processes above. Specifically, these include block predictions (inter- and intra-frame) and the block transforms (which include the forward DCT transform, quantizing, inverse quantizing, and inverse DCT transform of each block). One aspect of the present invention addresses these processes using any stream processor-based architecture that includes a mechanism for scheduling software threads to run on any of the available processors, and in which data can be shared among blocks of processors for SIMD (single instruction, multiple data) type of execution. For example, the most commonly available stream processor architectures are those implemented on commercially available graphics processing units (GPUs) such as those from NVIDIA of Santa Clara, Calif. Commercially available units offer, for example, 64 or 128 processor cores.

Figure 6:
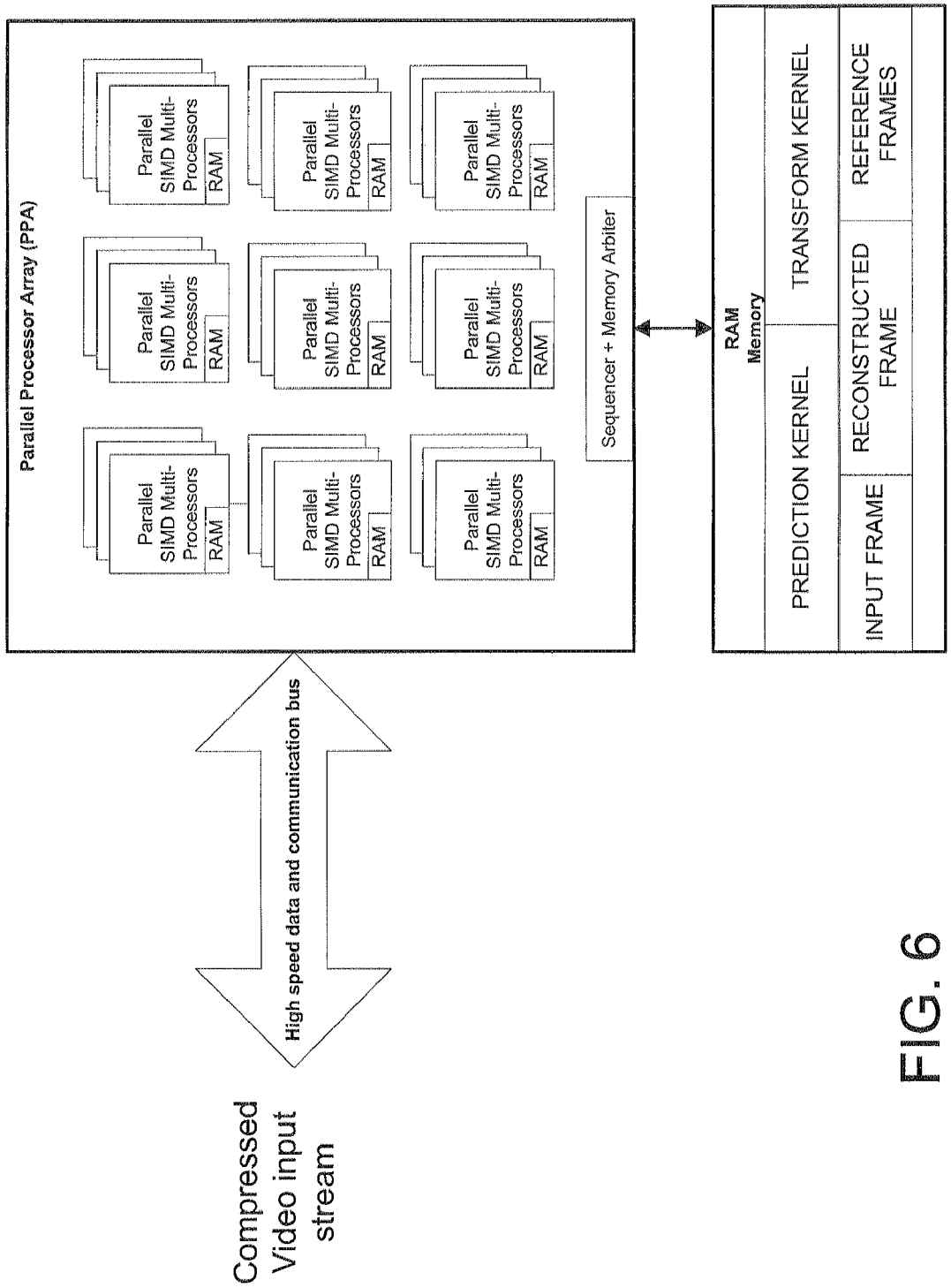
FIG. 6 is a simplified block diagram a processor array showing multiple blocks of processors arranged for SIMD operations.

FIG. 6 is a simplified block diagram one example of a processor array showing multiple blocks of processors arranged for SIMD operation. The illustrated array contains one or more groups of homogeneous multipurpose SIMD multiprocessors that are designed to operate on highly parallel problems where many processors can work in parallel. Each multiprocessor or block of processors contains one or more SIMD (Single Instruction Multiple Data) processors, and also contains a memory cache (illustrated as RAM but may be other types of cache) enabling fast access and communication between each SIMD processor in the multiprocessor. There is also, in the illustrated embodiment, a random access memory (RAM) shared by all multiprocessors in the array, that may be used to store the video frames, macroblock coefficient data, macroblock metadata, and multiprocessor instructions. There is also illustrated a sequencer and memory arbiter to automatically and efficiently select processors to execute a set of instructions.

Figure 3:
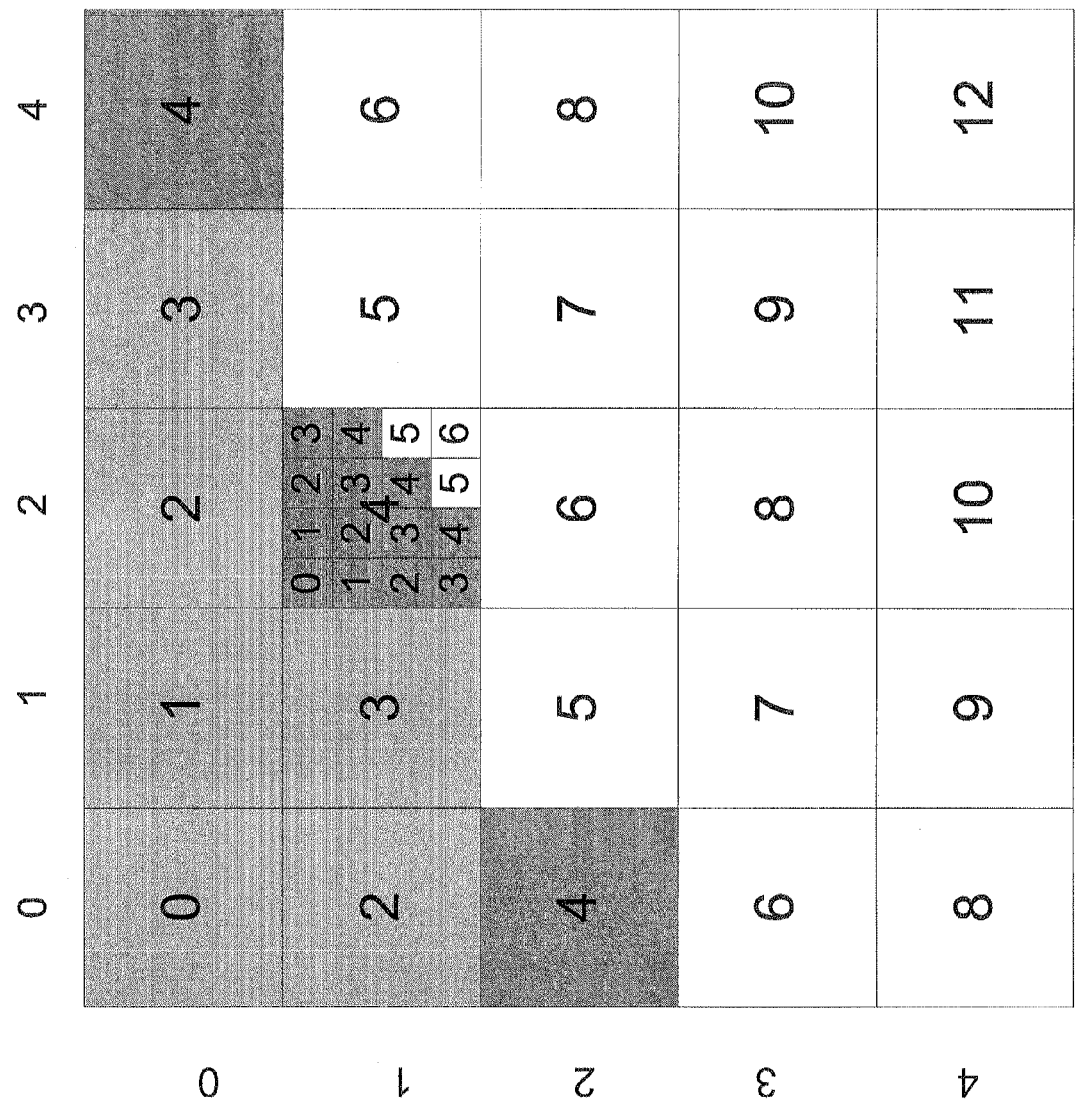
FIG. 3 is a conceptual diagram of the frame of FIG. 1 illustrating a low-angle sweep order consistent with one embodiment of the invention.

In one presently preferred embodiment, predictions and transforms are solved using stream processors as illustrated conceptually in FIG. 3. In processing the frame of FIG. 3, for example, a block of SIMD processors is allocated for each macroblock, and N threads of software run on each block of processors to generate the predictions, residuals, and SADs, and all transforms and inverse transforms for 256 pixels (16× 16) of luma data. Thus the total number of threads running concurrently may be up to N times the number of allocated blocks of processors. Another similar block of SIMD processors are allocated to process each chroma macroblock in a similar manner.

The integer N (number of threads) will vary, depending on the particular implementation and the specific process running at a given time. In some cases, N may be a multiple of 32. We have discovered that N=64 is a preferred arrangement for each phase of the encoding: prediction, transforms, and reconstruction. Each phase of the encoding may have a different allocation of the threads to the problem. In the case of the DCT calculation, for example, each thread preferably calculates the matrix multiplication for 4 pixels (first a column of 4 pixels, then a row).

The threads and their respective tasks are divided up so that they do not conflict with each other during calculations. To illustrate, a 16×16 block may be partitioned into 16 4×4 blocks, each sub-block having 4 rows and 4 columns. There are thus 64 columns of 4 pixels, and one thread may be applied to each column for parallel execution.

Each phase of the codec must allocate threads in a similar manner, but each is unique in what each thread does and how many pixels are being operated on, and the number of processors available.

Sweep Processing a Full Frame

Allocated blocks of stream processors process a frame of video in a "sweeping" manner—a term we used to describe techniques for ordering the processing in order to maintain the neighbor dependencies required to code each block. For example, FIG. 3 illustrates "sweep processing" of a frame of 5×5 macroblocks. This frame will be fully encoded with 12 processing sweeps. The sweep number is shown in the center of each macroblock. Each macroblock with the same sweep number will be processed concurrently by separately allocated SIMD processor blocks.[3] Thus, in sweep 2 for example, the two macroblocks located at row, column (0,2) and (1,0) are processed concurrently. A first set of SIMD processors are allocated to process macroblock (0,2) and a second set of processors are allocated to process macroblock (1,0). In sweep 4, where parallelism is maximized, there are three blocks of SIMD processors blocks processing three macroblocks concurrently. In one embodiment, there may be 64 threads applied to prediction calculations, as explained above, for each block. If the implementation hardware has sufficient resources, there may be 4×64 or 256 threads running on the processor concurrently during a sweep that includes four macroblocks.

[3] Processor "blocks" refers to a set of processors; not to be confused with macroblocks of sample data.

The frame depicted in FIG. 3 also contains blocks that have 4×4 prediction mixed with those that are 16×16. 4×4 predicted blocks (or other sub-blocks) may be processed with another sweep inside the macroblock within the larger sweep as shown in block 301. In other words, each sub-block itself can be processed using the sweep concept that processes selected groups of pixels concurrently using multiple threads.

FIG. 3 shows a full "low-angle" implementation; this allows all prediction mode possibilities to be computed. The dark shade is the current sweep and shows how 4×4 blocks can be processed at the same time as 16×16 blocks. Instead of processing macroblocks in raster scan order, a diagonal sweep is performed. In the first sweep, only Macroblock (0,0) is processed. In the second sweep, Macroblock (1,0) is processed. In the third sweep, however, Macroblocks (2,0) and (0,1) are processed (because there are multiple processors available, more than one macroblock can be processed at the same time). In the fourth sweep (number "3" in the drawing), Macroblocks (0,3) and (1,2) are processed. In the fifth sweep, Macroblocks (4,0), (3,1), and (2,0) are processed. This pattern continues for all the macroblocks in the image.

Parallelism continues to increase as the resolution increases; for example, for a 1080 p (1920×1080) resolution image, the speedup over a conventional implementation is 32 times. Once the transformed coefficients have been calculated and the reconstructed frame complete, the run-length encoded coefficients are sent to the CPU to complete the serial entropy encoding which is the final step in video compression.

In an alternative embodiment, a 45-degree diagonal sweep implementation may also be utilized as depicted in FIG. 4. In this implementation, two of the nine 4×4 prediction modes are not supported (mode 3, diagonal down-left and mode 7, vertical-left) and thus compression efficiency is compromised slightly. However, as there are fewer horizontal blocks that need to be processed before each new vertical row begins, the total number of sweeps is reduced (8 in this case vs. 12 for the other).

In the first sweep, Macroblock (0,0) is processed. In the second sweep, Macroblocks (1,0) and (0,1) are processed. In the third sweep, Macroblocks (2,0), (1,1), and (0,2) are processed, and so on. Again, the pattern continues until all the macroblocks in the image are processed. Using this diagonal method instead of the low-angle method results in a 36% increase in performance relative to the low-angle method, and 43 times faster than a conventional implementation.

Prediction Kernel Processing

Another way to gain more parallelism is to process the predictions and the transforms in two steps and allocate processors differently in each step. In this case, some minor compression efficiency is lost as the predictions are being made on a different set of data. A best-guess prediction can be made for all blocks in complete parallel without using a sweep by comparing the prediction block to the input block instead of the reconstructed reference block.

Motion vectors can also be found by searching in a window around the current block without using the predicted motion vector. This technique increases the overall speed of processing at the expense of compression efficiency by allowing more threads to run concurrently to select the proper prediction. This prediction selection for each block is then sent to the transform kernel (described below) which may be processed in a sweep as described previously to produce the coefficients used in the entropy encoding.

Figure 5:
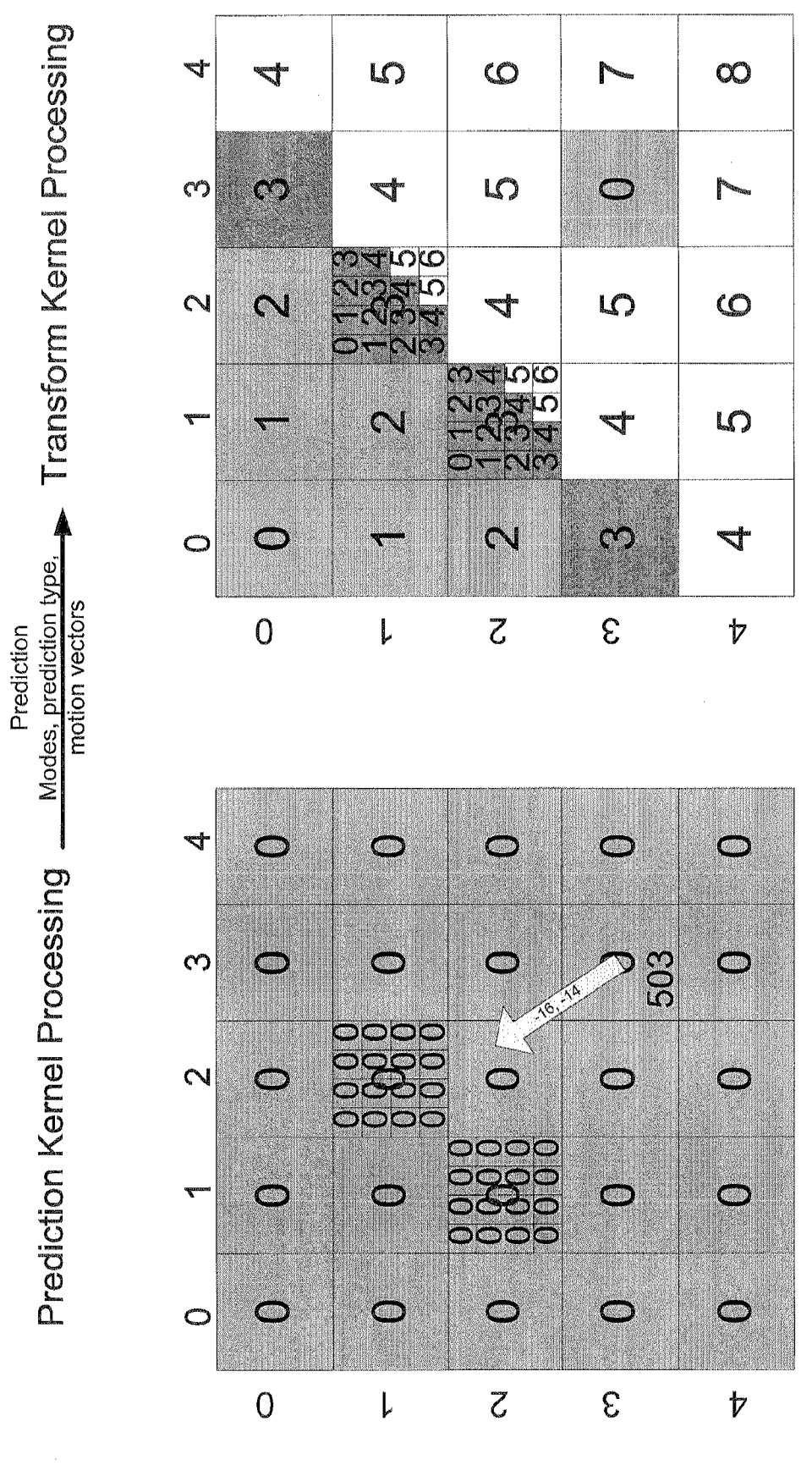

This technique is illustrated conceptually in FIG. 5. All blocks in the frame 501 are predicted in one step, including motion estimation for all blocks and 4×4 sub-partitions. Preferably all blocks are being processed in parallel utilizing as many processors as are available in that step. (Recall that in one "sweep" a separate set of processors is allocated to process each macroblock.) The order here is not critical; blocks may be processed out of order or in random order within a given sweep processing step. Macroblock (3,3) (503) is shown with a motion vector that was found to be a the best prediction in this example.

The results of the prediction kernel (prediction modes, prediction type, and motion vectors) for each block are then sent to a transform kernel. As illustrated in sample frame 502, the transform kernel also applies a sweep processing technique and calculates the final coefficients to be sent to the CPU for entropy encoding. A diagonal sweep is illustrated. Any macroblock predicted using inter-frame prediction (such as the macroblock at (3,3)) can also be processed in sweep 0 because there is no dependence on neighboring macroblocks, only reference frames are required which have already been processed. As above, sets of processors are allocated, for example in a GPU, to each macroblock for processing. This technique dramatically increases parallelism and processing speed especially for P and B frames due to better use of the processors and more threads executing concurrently.

During a transcode operation such as MPEG2 to H.264, motion vectors from the original encoding may be available for cueing the motion estimation process. In this case, compression efficiency is gained as the previously coded motion vectors offer a good starting point for the motion estimation algorithms and are likely to be closer to the predicted motion vector resulting in less bits being used to encode it.

Thus we have seen that FIG. 5 is a conceptual diagram showing processing a video frame in two steps employing a prediction kernel and a transform kernel. The prediction kernel preferably decides all prediction modes, types, and motion vectors for the frame as described above. The transform kernel preferably computes the forward DCT transform, quantized transform, inverse quantized transform and the reverse DCT.

The methods disclosed above can be applied to any block-based video compression system that requires information from neighboring blocks before a current block is processed. Beside intra-frame block prediction (the example described above), other processes to which various embodiments can be applied advantageously include motion estimation, in-loop deblocking, and rate control. In addition to AVC/H.264, many block-based codecs utilize these algorithms including VC-1, MPEG-2, Flash (or On2), and other video compression standards.

Digital Processors, Software and Memory Nomenclature

As explained above, the invention preferably is carried out by a digital computing system, for example a CPU working in tandem with a GPU. More specifically, by the term "digital computing system" we mean any system that includes at least one digital processor and associated memory, wherein the digital processor can execute instructions or "code" stored in that memory. (The memory may store data as well.) A digital processor includes but is not limited to a microprocessor, multi-core processor, DSP (digital signal processor). GPU, processor array, network processor, etc. A digital processor (or many of them) may be embedded into an integrated circuit such as a GPU. In other arrangements, one or more processors may be deployed on a circuit board (motherboard, daughter board, rack blade, etc.). Processors often form part of a larger device such as a laptop or desktop computer, a PDA, cell phone, iPhone PDA, Blackberry® PDA/phone, or indeed virtually any electronic device. The concepts of the present invention may be deployed to advantage in many of these various environments. Preferably, the methods may be implemented in software stored in memory, further defined below. In a GPU, processors may be arranged in groups, for example eight processors, for SIMD operation. One example of a multiprocessor array is illustrated in FIG. 6.

Digital memory, further explained below, may be integrated together with a processor, for example RAM or FLASH memory embedded in an integrated circuit CPU. GPU or the like. In other examples, the memory comprises a physically separate device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As explained above, the present invention preferably is implemented or embodied in computer software (also known as a "computer program" or "code"; we use these terms interchangeably). In some embodiments, we described program "threads" which are relatively simple programs. Multiple program threads typically can be executed concurrently in a block of SIMD processors, each processor in the block executing the same code on a different set of data. See FIG. 6. We also referred to a prediction kernel, and a transform kernel, each of which is a program. Programs, or code, are most useful when stored in a digital memory that can be read by one or more digital processors. We use the term "computer-readable storage medium" (or alternatively, "machine-readable storage medium") to include all of the foregoing types of memory, as well as new technologies that may arise in the future, as long as they are capable of storing digital information in the nature of a computer program or other data, at least temporarily, in such a manner that the stored information can be "read" by an appropriate digital processor. By the term "computer-readable" we do not intend to limit the phrase to the historical usage of "computer" to imply a complete mainframe, mini-computer, desktop or even laptop computer. Rather, we use the term to mean that the storage medium is readable by a digital processor or any digital computing system as broadly defined above. Such media may be any available media that is locally and/or remotely accessible by a computer or processor, and it includes both volatile and nonvolatile media, removable and non-removable media, embedded or discrete.

Computer Program Product

Where executable code has been stored in a machine-readable storage medium for distribution, we may refer to that storage medium as a "computer program product." For example, a portable digital storage medium may be used as a convenient means to store and transport (deliver, buy, sell, license) a computer program. Historically, this method was often used for retail point-of-sale delivery of packaged ("shrink wrapped") programs. Examples of such storage media include without limitation CD-ROM and the like. Such a CD-ROM, containing a stored computer program, thus would be an example of a "computer program product." In other cases, disks, tape, or other machine-readable storage media are used for distributing software from the owner or creator to an OEM for installation in the OEM's products, for example, to install embedded code into a video card or GPU prior to sale of that product. That "master" disk is again a computer program product. The receiving OEM typically would be licensed by the owner to make and distribute copies of the code in embedded form. Each such product then includes the code stored in machine-readable media, although generally the end product would not be considered a "computer program product" as the embedded code is not intended for subsequent transfer or installation in another product.

It will be obvious to those having skill in the art that many changes may be made to the details of the above-described embodiments without departing from the underlying principles of the invention. The scope of the present invention should, therefore, be determined only by the following claims.

The invention claimed is:

1. A method for encoding digital video data, the method comprising:

receiving a frame of video input data, the frame comprising a set of macroblocks, each macroblock comprising associated luma data and chroma data;

for each macroblock of the frame, selecting a corresponding motion vector, prediction mode and prediction type;

transform kernel processing the macroblocks in a selected order defined by a series of sweeps, said transform kernel processing the macroblocks including for each macroblock— forming a corresponding residual block;

transforming the residual block into a frequency representation;

quantizing the frequency representation of the residual block to form quantized transform coefficients for use in forming a compressed bitstream;

inverse quantizing the quantized transform coefficients to form inverse quantized data;

reverse transforming the inverse quantized data to form a second residual block;

forming a reconstructed block for use in creating a reconstructed reference frame;

and further wherein the transform kernel processing comprises— assigning each macroblock of the frame to exactly one of a series of sweeps; and wherein the series of sweeps comprises an initial sweep, the initial sweep including a macroblock located at an upper left corner of the frame, and then a series of subsequent sweeps, each subsequent sweep selected so as to concurrently process all unprocessed macroblocks as to which all macroblocks located in the frame above and or to the left of the unprocessed macroblocks have been processed.

2. The method of claim 1 wherein assigning the macroblocks includes assigning each macroblock to a selected sweep so as to minimize serial dependencies among the sweeps while maximizing parallelism in processing the frame.

3. The method of claim 1 wherein assigning the macroblocks includes assigning each macroblock to a selected sweep so as to form a 45-degree diagonal sweep pattern.

4. The method of claim 1 wherein assigning the macroblocks includes assigning each macroblock to a selected sweep of the series so as to form a low-angle sweep series.

5. The method of claim 1 wherein processing a current macroblock includes executing multiple execution threads in SIMD fashion.

6. The method of claim 1 and wherein processing a current macroblock includes executing multiple execution threads in parallel.

7. A method for encoding digital video data, the method comprising:
   receiving a frame of video input data, the frame comprising a set of macroblocks, each macroblock comprising associated luma data and chroma data;
   providing a prediction kernel arranged for execution on an array of processors;
   providing a transform kernel arranged for execution on the array of processors;
   allocating a first block of the processors to execute the prediction kernel on the frame;
   in the allocated processors, executing the prediction kernel on the frame so as to determine prediction modes, types, and motion vectors for the frame;
   and then, reallocating the first block of processors to execute a transform kernel using the prediction kernel results; and then
   in the reallocated processors, executing the transform kernel so as to compute forward Discrete Cosine Transformation (DCT) transform coefficients, quantized transform, inverse quantized transform and the reverse DCT;
   wherein said executing the prediction kernel on the frame comprises processing the macroblocks of the frame in any order.

8. A method for encoding digital video data, the method comprising:
   receiving a frame of video input data, the frame comprising a set of macroblocks, each macroblock comprising associated luma data and chroma data;
   providing a prediction kernel arranged for execution on an array of processors;
   providing a transform kernel arranged for execution on the array of processors;
   allocating a first block of the processors to execute the prediction kernel on the frame;
   in the allocated processors, executing the prediction kernel on the frame so as to determine prediction modes, types, and motion vectors for the frame;
   and then, reallocating the first block of processors to execute a transform kernel using the prediction kernel results; and then
   in the reallocated processors, executing the transform kernel so as to compute forward Discrete Cosine Transformation (DCT) transform coefficients, quantized transform, inverse quantized transform and the reverse DCT;
   wherein the processing of each individual sweep comprises processing all of the assigned macroblocks of the sweep in a random sequence.

9. A method for encoding digital video data, the method comprising:
   receiving a frame of video input data, the frame comprising a set of macroblocks, each macroblock comprising associated luma data and chroma data;
   providing a prediction kernel arranged for execution on an array of processors;
   providing a transform kernel arranged for execution on the array of processors;
   allocating a first block of the processors to execute the prediction kernel on the frame;
   in the allocated processors, executing the prediction kernel on the frame so as to determine prediction modes, types, and motion vectors for the frame;
   and then, reallocating the first block of processors to execute a transform kernel using the prediction kernel results; and then in the reallocated processors, executing the transform kernel so as to computes forward DCT Discrete Cosine Transformation (DCT) transform coefficients, quantized transform, inverse quantized transform and the reverse DCT;
   wherein said executing the prediction kernel on the frame comprises processing the macroblocks of the frame in a random sequence.

10. A method for encoding digital video data, the method comprising:
    receiving a frame of video input data, the frame comprising a set of macroblocks, each macroblock comprising associated luma data and chroma data;
    providing a prediction kernel arranged for execution on an array of processors;
    providing a transform kernel arranged for execution on the array of processors;
    allocating a first block of the processors to execute the prediction kernel on the frame;
    in the allocated processors, executing the prediction kernel on the frame so as to determine prediction modes, types, and motion vectors for the frame;
    and then, reallocating the first block of processors to execute a transform kernel using the prediction kernel results; and then
    in the reallocated processors, executing the transform kernel so as to compute forward Discrete Cosine Transformation (DCT) transform coefficients, quantized transform, inverse quantized transform and the reverse DCT;
    wherein said executing the prediction kernel on the frame comprises processing the macroblocks of the frame in a predetermined sequence.

11. The method according to claim 7 and further comprising allocating a plurality of threads for parallel execution of the transform kernel in SIMD fashion.

12. A method for encoding digital video data, the method comprising:
    receiving a frame of video input data, the frame comprising a set of macroblocks, each macroblock comprising associated luma data and chroma data;
    providing a prediction kernel arranged for execution on an array of processors;
    providing a transform kernel arranged for execution on the array of processors;
    allocating a first block of the processors to execute the prediction kernel on the frame;

in the allocated processors, executing the prediction kernel on the frame so as to determine prediction modes, types, and motion vectors for the frame;

and then, reallocating the first block of processors to execute a transform kernel using the prediction kernel results; and then in the reallocated processors, executing the transform kernel so as to compute forward Discrete Cosine Transformation (DCT) transform coefficients, quantized transform, inverse quantized transform and the reverse DCT;

wherein executing the transform kernel comprises:

assigning each macroblock of the frame to exactly one sweep; and sequentially processing a series of sweeps;

wherein the processing of each individual sweep comprises processing all of the assigned macroblocks of the sweep.

13. A method for encoding digital video data, the method comprising:

receiving a frame of video input data, the frame comprising a set of macroblocks, each macroblock comprising associated luma data and chroma data;

providing a prediction kernel arranged for execution on an array of processors;

providing a transform kernel arranged for execution on the array of processors;

allocating a first block of the processors to execute the prediction kernel on the frame;

in the allocated processors, executing the prediction kernel on the frame so as to determine prediction modes, types, and motion vectors for the frame;

and then, reallocating the first block of processors to execute a transform kernel using the prediction kernel results; and then in the reallocated processors, executing the transform kernel so as to compute forward Discrete Cosine Transformation (DCT) transform coefficients, quantized transform, inverse quantized transform and the reverse DCT;

wherein the processing of each individual sweep comprises processing all of the assigned macroblocks of the sweep in a predetermined sequence.

14. A method for encoding digital video data, the method comprising:

receiving a frame of video input data, the frame comprising a set of macroblocks, each macroblock comprising associated luma data and chroma data;

processing the macroblocks in a selected order defined by a series of sweeps, said processing the macroblocks including:

assigning each macroblock of the frame to exactly one sweep; and sequentially processing the series of sweeps;

wherein the processing of each sweep comprises processing all of the assigned macroblocks of the sweep in parallel; and performing at least one sub-sweep within a sub-block of a selected macroblock, the sub-sweep having a pattern determined by coding dependencies.

15. The method according to claim 14 wherein processing the macroblocks includes assigning a respective block of processors of a GPU to each of the macroblocks in the sweep for processing the macroblocks of the sweep in parallel.

16. The method according to claim 14 wherein processing the macroblocks includes allocating multiple threads to the prediction calculations for each macroblock of a sweep, wherein each thread is allocated to process a respective subset of pixels of the corresponding macroblock.

17. The method according to claim 14 wherein processing the macroblocks includes allocating multiple threads to the prediction calculations for each macroblock of a sweep, wherein each thread is applied to a different error metric for determining a best choice prediction for the current macroblock.

18. A method for encoding digital video data, the method comprising:

receiving a frame of video input data, the frame comprising a set of macroblocks, each macroblock comprising associated luma data and chroma data;

partitioning at least one of the macroblocks to form a plurality of partitions;

prediction processing each partition of the partitioned macroblock, so as to determine a corresponding motion vector, prediction mode and prediction type;

transform processing the partitions, responsive to the prediction data generated in the said prediction processing step, said transform processing the partitions including:

assigning each partition of the partitioned macroblock to exactly one sweep of a series of sweeps; wherein the series of sweeps comprises an initial sweep, the initial sweep including a macroblock located at an upper left corner of the frame, and then a series of subsequent sweeps, each subsequent sweep arranged to concurrently transform process all unprocessed partitions for which all other partitions located in the partitioned frame above and or to the left of the unprocessed partitions have been transform processed.

19. The method of claim 18 wherein assigning the partitions includes assigning each partition to a selected sweep so as to form a 45-degree diagonal sweep pattern.

20. The method of claim 18 wherein assigning the partitions includes assigning each partition to a selected sweep of the series so as to form a low-angle sweep series.

* * * * *